US005942758A

United States Patent [19]
Park

[11] Patent Number: 5,942,758
[45] Date of Patent: Aug. 24, 1999

[54] SHIELDED LENS

[75] Inventor: Melvin Park, Nashua, N.H.

[73] Assignee: Bruker Daltronics, Inc., Billerica, Mass.

[21] Appl. No.: 08/926,541

[22] Filed: Sep. 10, 1997

[51] Int. Cl.$^6$ ............................ G21K 1/08; G21K 1/087; B01D 59/44

[52] U.S. Cl. ...................... 250/396 R; 250/287; 250/281

[58] Field of Search ............................... 250/396 R, 287, 250/281

[56] References Cited

U.S. PATENT DOCUMENTS

| | | | |
|---|---|---|---|
| 5,144,127 | 9/1992 | Williams et al. | 250/287 |
| 5,464,985 | 11/1995 | Cornish et al. | 250/396 R |
| 5,614,711 | 3/1997 | Li et al. | 250/287 |

*Primary Examiner*—Edward P. Westin
*Assistant Examiner*—Albert Gagliardi
*Attorney, Agent, or Firm*—Ward & Olivo

[57] ABSTRACT

The present invention relates generally to ion beam handling in mass spectrometers, and more specifically to a method and apparatus for focusing ions in time-of-flight mass spectrometers (TOFMS). This invention focuses ions using one or more electrodes bound on at least one side by an electrically conducting grid. Electric fields generated by the electrodes focus the ions. With electric fields of the proper strength and geometry, ions may be focused onto a point some desired distance from the source. According to the preferred embodiment of the present invention, a shielded lens, in the form of an electrically conducting cylinder and two conducting grids, is used to produce and adjust the position of an ion focal point.

4 Claims, 8 Drawing Sheets

SHIELDED LENS

TECHNICAL FIELD OF THE INVENTION

The present invention relates generally to the mass spectroscopic analysis of chemical samples and more particularly to time-of-flight mass spectrometry. More specifically, a means and method are described for the focusing of ions in time-of-flight mass spectrometry.

BACKGROUND OF THE INVENTION

This invention relates in general to ion beam handling in mass spectrometers and more particularly to a means of focusing ions in time-of-flight mass spectrometers (TOFMS). The apparatus and method of mass analysis described herein is an enhancement of the techniques that are referred to in the literature relating to mass spectrometry.

The analysis of ions by mass spectrometers is important, as mass spectrometers are instruments that are used to determine the chemical structures of molecules. In these instruments, molecules become positively or negatively charged in an ionization source and the masses of the resultant ions are determined in vacuum by a mass analyzer that measures their mass/charge (m/z) ratio. Mass analyzers come in a variety of types, including magnetic field (B), combined (double-focusing) electrical (E) and magnetic field (B), quadrupole (Q), ion cyclotron resonance (ICR), quadrupole ion storage trap, and time-of-flight (TOF) mass analyzers, which are of particular importance with respect to the invention disclosed herein. Each mass spectrometric method has a unique set of attributes. Thus, TOFMS is one mass spectrometric method that arose out of the evolution of the larger field of mass spectrometry.

The analysis of ions by TOFMS is, as the name suggests, based on the measurement of the flight times of ions from an initial position to a final position. Ions which have the same initial kinetic energy but different masses will separate when allowed to drift through a field free region.

Ions are conventionally extracted from an ion source in small packets. The ions acquire different velocities according to the mass-to-charge ratio of the ions. Lighter ions will arrive at a detector prior to high mass ions. Determining the time-of-flight of the ions across a propagation path permits the determination of the masses of different ions. The propagation path may be circular or helical, as in cyclotron resonance spectrometry, but typically linear propagation paths are used for TOFMS applications.

TOFMS is used to form a mass spectrum for ions contained in a sample of interest. Conventionally, the sample is divided into packets of ions that are launched along the propagation path using a pulse-and-wait approach. In releasing packets, one concern is that the lighter and faster ions of a trailing packet will pass the heavier and slower ions of a preceding packet. Using the traditional pulse-and-wait approach, the release of an ion packet as timed to ensure that the ions of a preceding packet reach the detector before any overlap can occur. Thus, the periods between packets is relatively long. If ions are being generated continuously, only a small percentage of the ions undergo detection. A significant amount of sample material is thereby wasted. The loss in efficiency and sensitivity can be reduced by storing ions that are generated between the launching of individual packets, but the storage approach carries some disadvantages.

Resolution is an important consideration in the design and operation of a mass spectrometer for ion analysis. The traditional pulse-and-wait approach in releasing packets of ions enables resolution of ions of different masses by separating the ions into discernible groups. However, other factors are also involved in determining the resolution of a mass spectrometry system. "Space resolution" is the ability of the system to resolve ions of different masses despite an initial spatial position distribution within an ion source from which the packets are extracted. Differences in starting position will affect the time required for traversing a propagation path. "Energy resolution" is the ability of the system to resolve ions of different mass despite an initial velocity distribution. Different starting velocities will affect the time required for traversing the propagation path.

In addition, two or more mass analyzers may be combined in a single instrument to form a tandem mass spectrometer (MS/MS, MS/MS/MS, etc.). The most common MS/MS instruments are four sector instruments (EBEB or BEEB), triple quadrupoles (QQQ), and hybrid instruments (EBQQ or BEQQ). The mass/charge ratio measured for a molecular ion is used to determine the molecular weight of a compound. In addition, molecular ions may dissociate at specific chemical bonds to form fragment ions. Mass/charge ratios of these fragment ions are used to elucidate the chemical structure of the molecule. Tandem mass spectrometers have a particular advantage for structural analysis in that the first mass analyzer (MS1) can be used to measure and select molecular ion from a mixture of molecules, while the second mass analyzer (MS2) can be used to record the structural fragments. In tandem instruments, a means is provided to induce fragmentation in the region between the two mass analyzers. The most common method employs a collision chamber filled with an inert gas, and is known as collision induced dissociation CID. Such collisions can be carried out at high (5–10 keV) or low (10–100 eV) kinetic energies, or may involve specific chemical (ion-molecule) reactions. Fragmentation may also be induced using laser beams (photodissociation), electron beams (electron induced dissociation), or through collisions with surfaces (surface induced dissociation). It is possible to perform such an analysis using a variety of types of mass analyzers including TOF mass analysis.

In a TOFMS instrument, molecular and fragment ions formed in the source are accelerated to a kinetic energy $$eV=1/2nv^2 \quad (1)$$

where e is the elemental charge, V is the potential across the source/accelerating region, m is the ion mass, and v is the ion velocity. These ions pass through a field-free drift region of length L with velocities given by equation 1. The time required for a particular ion to traverse the drift region is directly proportional to the square root of the mass/charge:

$$t = L\sqrt{\frac{m}{2eV}} \quad (2)$$

Conversely, the mass/charge ratios of ions can be determined from their flight times according to the equation:

$$\frac{m}{e} = at^2 + b \quad (3)$$

where a and b are constants which can be determined experimentally from the flight times of two or more ions of known mass/charge ratios.

Generally, TOF mass spectrometers have limited mass resolution. This arises because there may be uncertainties in the time that the ions were formed (time distribution), in their location in the accelerating field at the time they were formed (spatial distribution), and in their initial kinetic energy distributions prior to acceleration (energy distribution).

The first commercially successful TOFMS was based on an instrument described by Wiley and McLaren in 1955 (Wiley, W. C.; McLaren, I. H., Rev. Sci. Instrumen. 26 1150 (1955)). That instrument utilized electron impact (EI) ionization (which is limited to volatile samples) and a method for spatial and energy focusing known as time-lag focusing. In brief, molecules are first ionized by a pulsed (1–5 microsecond) electron beam. Spatial focusing was accomplished using multiple-stage acceleration of the ions. In the first stage, a low voltage (−150 V) draw-out pulse is applied to the source region that compensates for ions formed at different locations, while the second (and other) stages complete the acceleration of the ions to their final kinetic energy (−3 keV ). A short time-delay (1–7 microseconds) between the ionization and draw-out pulses compensates for different initial kinetic energies of the ions, and is designed to improve mass resolution. Because this method required a very fast (40 ns) rise time pulse in the source region, it was convenient to place the ion source at ground potential, while the drift region floats at −3 kV.

The instrument was commercialized by Bendix Corporation as the model NA-2, and later by CVC Products (Rochester, N.Y.) as the model CVC-2000 mass spectrometer. The instrument has a practical mass range of 400 Daltons and a mass resolution of 1/300, and is still commercially available.

There have been a number of variations on this instrument. Muga (TOFTEC, Gainsville) has described a velocity compaction technique for improving the mass resolution (Muga velocity compaction). Chatfield et al. (Chatfield FT-TOF) described a method for frequency modulation of gates placed at either end of the flight tube, and Fourier transformation to the time domain to obtain mass spectra. This method was designed to improve the duty cycle.

Cotter et al. (VanBreeman, R. B.: Snow, M.: Cotter, R. J., Int. J. Mass Spectrom. Ion Phys. 49 (1983) 35.; Tabet, J. C.; Cotter, R. J., Anal. Chem. 56 (1984) 1662; Olthoff, J. K.; Lys, I.: Demirev, P.: Cotter, R. J., Anal. Instrumen. 16 (1987) 93, modified a CVC 2000 time-of-flight mass spectrometer for infrared laser desorption of involatile biomolecules, using a Tachisto (Needham, Mass.) model 215G pulsed carbon dioxide laser. This group also constructed a pulsed liquid secondary time-of-flight mass spectrometer (liquid SIMS-TOF) utilizing a pulsed (1–5 microsecond) beam of 5 keV cesium ions, a liquid sample matrix, a symmetric push/pull arrangement for pulsed ion extraction (Olthoff, J. K.; Cotter, R. J., Anal. Chem. 59 (1987) 999–1002.; Olthoff, J. K.; Cotter, R. J., Nucl. Instrum. Meth. Phys. Res. B-26 (1987) 566–570. In both of these instruments, the time delay range between ion formation and extraction was extended to 5–50 microseconds, and was used to permit metastable fragmentation of large molecules prior to extraction from the source. This in turn reveals more structural information in the mass spectra.

The plasma desorption technique introduced by Macfarlane and Torgerson in 1974 (Macfarlane, R. D.; Skowronski, R. P.; Torgerson, D. F., Biochem. Biophys. Res Commoun. 60 (1974) 616.) formed ions on a planar surface placed at a voltage of 20 kV. Since there are no spatial uncertainties, ions are accelerated promptly to their final kinetic energies toward a parallel, grounded extraction grid, and then travel through a grounded drift region. High voltages are used, since mass resolution is proportional to Uo/;eV, where the initial kinetic energy, Uo/ is of the order of a few electron volts. Plasma desorption mass spectrometers have been constructed at Rockefeller (Chait, B. T.; Field, F. H., J. Amer. Chem. Soc. 106 (1984) 193), Orsay (LeBeyec, Y.; Della Negra, S.; Deprun, C.; Vigny, P.; Giont, Y. M., Rev. Phys. Appl 15 (1980) 1631), Paris (Viari, A.; Ballini, J. P.; Vigny, P.; Shire, D.; Dousset, P., Biomed. Environ. Mass Spectrom, 14 (1987) 83), Upsalla (Hakansson, P.; Sundqvist B., Radiat. Eff. 61 (1982) 179) and Darmstadt (Becker, O.; Furstenau, N.; Krueger, F. R.; Weiss, G.; Wein, K., Nucl. Instrum. Methods 139 (1976) 195). A plasma desorption time-of-flight mass spectrometer has been commercialized by BIO-ION Nordic (Upsalla, Sweden). Plasma desorption utilizes primary ion particles with kinetic energies in the MeV range to induce desorption/ionization. A similar instrument was constructed at Manitobe (Chain, B. T.; Standing, K. G., Int. J. Mass Spectrum. Ion Phys. 40 (1981) 185) using primary ions in the keV range, but has not been commercialized.

Matrix-assisted laser desorption, introduced by Tanaka et al. (Tanaka, K.; Waki, H.; Ido, Y.; Akita, S.; Yoshida, Y.; Yoshica, T., Rapid Commun. Mass Spectrom. 2 (1988) 151) and by Karas and Hillenkamp (Karas, M.; Hillenkamp, F., Anal. Chem. 60 (1988) 2299) utilizes TOFMS to measure the molecular weights of proteins in excess of 100,000 Daltons. An instrument constructed at Rockefeller (Beavis, R. C.; Chait, B. T., Rapid Commun. Mass Spectrom. 3 (1989) 233) has been commercialized by VESTEC (Houston, Tex.), and employs prompt two-stage extraction of ions to an energy of 30 keV. Time-of-flight instruments with a constant extraction field have also been utilized with multi-photon ionization, using short pulse lasers.

The instruments described thus far are linear time-of-flights, that is—there is no additional focusing after the ions are accelerated and allowed to enter the drift region. Two approaches to additional energy focusing have been utilized—those which pass the ion beam through an electrostatic energy filter.

The reflectron (or ion mirror) was first described by Mamyrin (Mamyrin, B. A.; Karatajev, V. J.; Shmikk, D. V.; Zagulin, V. A., Sov. Phys., JETP 37 (1973) 45). At the end of the drift region, ions enter a retarding field from which they are reflected back through the drift region at a slight angle. Improved mass resolution results from the fact that ions with larger kinetic energies must penetrate the reflecting field more deeply before being turned around. These faster ions than catch up with the slower ions at the detector and are focused. Reflectrons were used on the laser microprobe instrument introduced by Hillenkamp et al. (Hillenkamp, F.; Kaufmann, R.; Nitsche, R.; Unsold, E., Appl. Phys. 8 (1975) 341) and commercialized by Leybold Hereaus as the LAMMA (LAser Microprobe Mass Analyzer). A similar instrument was also commercialized by Cambridge Instruments as the IA (Laser Ionization Mass Analyzer). Benninghoven (Benninghoven reflectron) has described a SIMS (secondary ion mass spectrometer) instrument that also utilizes a reflectron, and is currently being commercialized by Leybold Hereaus. A reflecting SIMS instrument has also been constructed by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

Lebeyec (Della-Negra, S.; Lebeyec, Y., in Ion Formation from Organic Solids IFOS III, ed. by A. Benninghoven, pp 42–45, Springer-Verlag, Berlin (1986)) described a coaxial reflectron time-of-flight that reflects ions along the same path in the drift tube as the incoming ions, and records their arrival times on a channelplate detector with a centered hole that allows passage of the initial (unreflected) beam. This geometry was also utilized by Tanaka et al. (Tanaka, K.; Waki, H.; Ido, Y.; Akita, S.; Yoshida, T., Rapid Comun. Mass Spectrom. 2 (1988) 151) for matrix assisted laser desorption. Schlag et al. (Grotemeyer, J.; Schlag, E. W., Org. Mass Spectrom. 22 (1987) 758) have used a reflectron on a two-laser instrument. The first laser is used to ablate solid samples, while the second laser forms ions by multi-photon ionization. This instrument is currently available from Bruker. Wollnik et al. (Grix., R.; Kutscher, R.; Li, G.; Gruner, U.; Wollnik, H., Rapid Commun. Mass Spectrom. 2 (1988) 83) have described the use of reflectrons in combination with pulsed ion extraction, and achieved mass resolutions as high as 20,000 for small ions produced by electron impact ionization.

An alternative to reflectrons is the passage of ions through an electrostatic energy filter, similar to that used in double-focusing sector instruments. This approach was first described by Poschenroeder (Poschenroeder, W., Int. J. Mass Spectrom. Ion Phys. 6 (1971) 413). Sakurai et al. (Sakuri, T.; Fujita, Y; Matsuo, T.; Matsuda, H; Katakuse, I., Int. J. Mass Spectrom. Ion Processes 66 (1985) 283) have developed a time-of-flight instrument employing four electrostatic energy analyzers (ESA) in the time-of-flight path. At Michigan State, an instrument known as the ETOF was described that utilizes a standard ESA in the TOF analyzer (Michigan ETOF).

Lebeyec et al. (Della-Negra, S.; Lebeyec, Y., in Ion Formation from Organic Solids IFOS III, ed. by A. Benninghoven, pp 42–45, Springer-Verlag, Berlin (1986)) have described a technique known as correlated reflex spectra, which can provide information on the fragment ion arising from a selected molecular ion. In this technique, the neutral species arising from fragmentation in the flight tube are recorded by a detector behind the reflectron at the same flight time as their parent masses. Reflected ions are registered only when a neutral species is recorded within a preselected time window. Thus, the resultant spectra provide fragment ion (structural) information for a particular molecular ion. This technique has also been utilized by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

Although TOF mass spectrometers do not scan the mass range, but record ions of all masses following each ionization event, this mode of operation has some analogy with the linked scans obtained on double-focusing sector instruments. In both instruments, MS/MS information is obtained at the expense of high resolution. In addition, correlated reflex spectra can be obtained only on instruments which record single ions on each TOF cycle, and are therefore not compatible with methods (such as laser desorption) which produce high ion currents following each laser pulse. New ionization techniques, such as plasma desorption (Macfarlane, R. D.; Skowronski, R. P.; Torgerson, D. F.; Biochem. Bios. Res. Commun. 60 (1974) 616), laser desorption (VanBreemen, R. B.; Snow, M.; Cotter, R. J., Int. J. Mass Spectrom. Ion Phys. 49 (1983) 35; Van der Peyl, G. J. Q.; Isa, K.; Haverkamp, J.; Kistemaker, P. G., Org. Mass Spectrom. 16 (1981) 416), fast atom bombardment (Barber, M.; Bordoli, R. S.; Sedwick, R. D.; Tyler, A. N., J. Chem. Soc., Chem. Commun. (1981) 325–326) and electrospray (Meng, C. K.; Mann, M.; Fenn, J. B., Z. Phys. D10 (1988) 361), have made it possible to examine the chemical structures of proteins and peptides, glycopeptides, glycolipids and other biological compounds without chemical derivatization. The molecular weights of intact proteins can be determined using matrix assisted laser desorption ionization (MALDI) on a TOF mass spectrometer or electrospray ionization. For more detailed structural analysis, proteins are generally cleaved chemically using CNBr or enzymatically using trypsin or other proteases. The resultant fragments, depending upon size, can be mapped using MALDI, plasma desorption or fast atom bombardment. In this case, the mixture of peptide fragments (digest) is examined directly resulting in a mass spectrum with a collection of molecular ion corresponding to the masses of each of the peptides. Finally, the amino acid sequences of the individual peptides which make up the whole protein can be determined by fractionation of the digest, followed by mass spectral analysis of each peptide to observe fragment ions that correspond to its sequence.

It is the sequencing of peptides for which tandem mass spectrometry has its major advantages. Generally, most of the new ionization techniques are successful in producing intact molecular ions, but not in producing fragmentation. In a tandem instrument the first mass analyzer passes molecular ions corresponding to the peptide of interest. These ions are activated toward fragmentation in a collision chamber, and their fragmentation products are extracted and focused into the second mass analyzer which records a fragment ion (or daughter ion) spectrum.

A tandem TOFMS consists of two TOF analysis regions with an ion gate between the two regions. The ion gate allows one to gate (i.e. select) ions which will be passed from the first TOF analysis region to the second. As in conventional TOFMS, ions of increasing mass have decreasing velocities and increasing flight times. Thus, the arrival time of ions at the ion gate at the end of the first TOF analysis region is dependent on the mass-to-charge ratio of the ions. If one opens the ion gate only at the arrival time of the ion mass of interest, then only ions of that mass-to-charge will be passed into the second TOF analysis region.

However, it should be noted that the products of an ion dissociation that occurs after the acceleration of the ion to its final potential will have the same velocity as the original ion. The product ions will therefore arrive at the ion gate at the same time as the original ion and will be passed by the gate (or not) just as the original ion would have been. The arrival times of product ions at the end of the second TOF analysis region is dependent on the product ion mass because a reflectron is used. As stated above, product ions have the same velocity as the reactant ions from which they originate. As a result, the kinetic energy of a product ion is directly proportional to the product ion mass. Because the flight time of an ion through a reflectron is dependent on the kinetic energy of the ion, and the kinetic energy of the product ions are dependent on their masses, the flight time of the product ions through the reflectron is dependent on their masses.

In TOF mass spectrometers, it is often the case that divergent ion beams are produced by the ion source. As a result, the ion beam must be focused by an electrostatic lens in order for a large fraction (i.e. >50%) of the ions to be successfully analyzed and detected. However, prior art lenses tend to operate at high voltage—often in excess of 10 kV—and have a significant influence on the flight time of the ions being analyzed. Further, the lens may have an unwanted influence on the ion's peak shape or width.

The purpose of the present invention is to focus ions onto a detector or other device with improved efficiency and decreased influence on the ion's flight time at a lower operating voltage than prior art devices.

Several references relate to the technology herein disclosed. For example, F. Hillenkamp, M. Karas, R. C. Beavis, B. T. Chait, Anal. Chem. 63(24), 1193A(1991); Wei Hang, Pengyuan Yag, Xiaoru Wang, Chenglong Yang, Yongxuan Su, and Benli Huang, Rapid Comm. Mass Spectrom. 8, 590(1994); A. N. Verentchikov, W. Ens, K. G. Standing, Anal.Chem. 66, 126(1994); J. H. J. Dawson, M. Guilhaus, Rapid Comm. Mass Spectrom. 3, 155(1989); M. Guilhaus, J. Am. Soc. Mass Spectrom. 5, 588(1994); E. Axelsson, L. Holmlid, Int. J. Mass Spectrom. Ion Process. 59, 231(1984); O. A. Mirgorodskaya, et al., Anal. Chem. 66, 99(1994); S. M. Michael, B. M. Chien, D. M. Lubman, Anal. Chem. 65, 2614(1993); W. C. Wiley, I. H. McLaren, Rev. Sci. Inst. 26(12), 1150(1955).

SUMMARY OF THE INVENTION

The present invention relates in general to ion beam handling in mass spectrometers and more particularly to a means of focusing ions in time-of-flight mass spectrometers (TOFMS). Electrostatic ion lenses rely on the deflection of ions by electrostatic fields to accomplish focusing. Among other factors, the intensity of the electrostatic field produced by a lens as a function of position determines the degree of deflection which ions passing through the device will experience. The direction of motion of ions entering an ion lens is typically related to the position at which the ion enters the lens. Proper focusing is obtained by forming an electrostatic field which deflects ions by varying degrees according to their entrance position in the same manner that the ion's direction of motion varies with entrance position. A properly formed electrostatic field can be used to decrease the angle of divergence of an ion beam or focus it to a focal point.

However, the electrostatic field of a lens may also produce unwanted effects. This electrostatic field will accelerate ions in the primary direction of ion motion as well as perpendicular to it. As a result, the time that ions spend in the lens will vary depending on their entrance position. In TOFMS, the result is a variation of the flight time of the ions and a broadening of the detection signal.

In the prior art, unshielded lenses are used wherein the electrostatic field is formed in such a way that the ion beam is actually defocused by portions of the field and focused by others. This inefficient use of the electrostatic field results in a higher operating voltage and more intense undesired effects than would otherwise be necessary.

A lens according to the present invention is shielded so as to eliminate the defocusing portions of the electrostatic field. This reduces the operating voltage by as much as an order of magnitude and thereby reduces many of the unwanted effects observed with conventional electrostatic lenses. The present invention is a specific design for a TOF mass spectrometer incorporating laser desorption, and a patented (U.S. Pat. No. 4,731,532) two stage gridless reflector.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to the preferred embodiment set forth in the illustrations of the accompanying drawing. Although the illustrated embodiment is merely exemplary of systems for carrying out the present invention, both the organization and method of operation of the invention, in general, together with further objectives and advantages thereof, may be more easily understood by reference to the drawings and the following description. The drawing is not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

Figure 1:
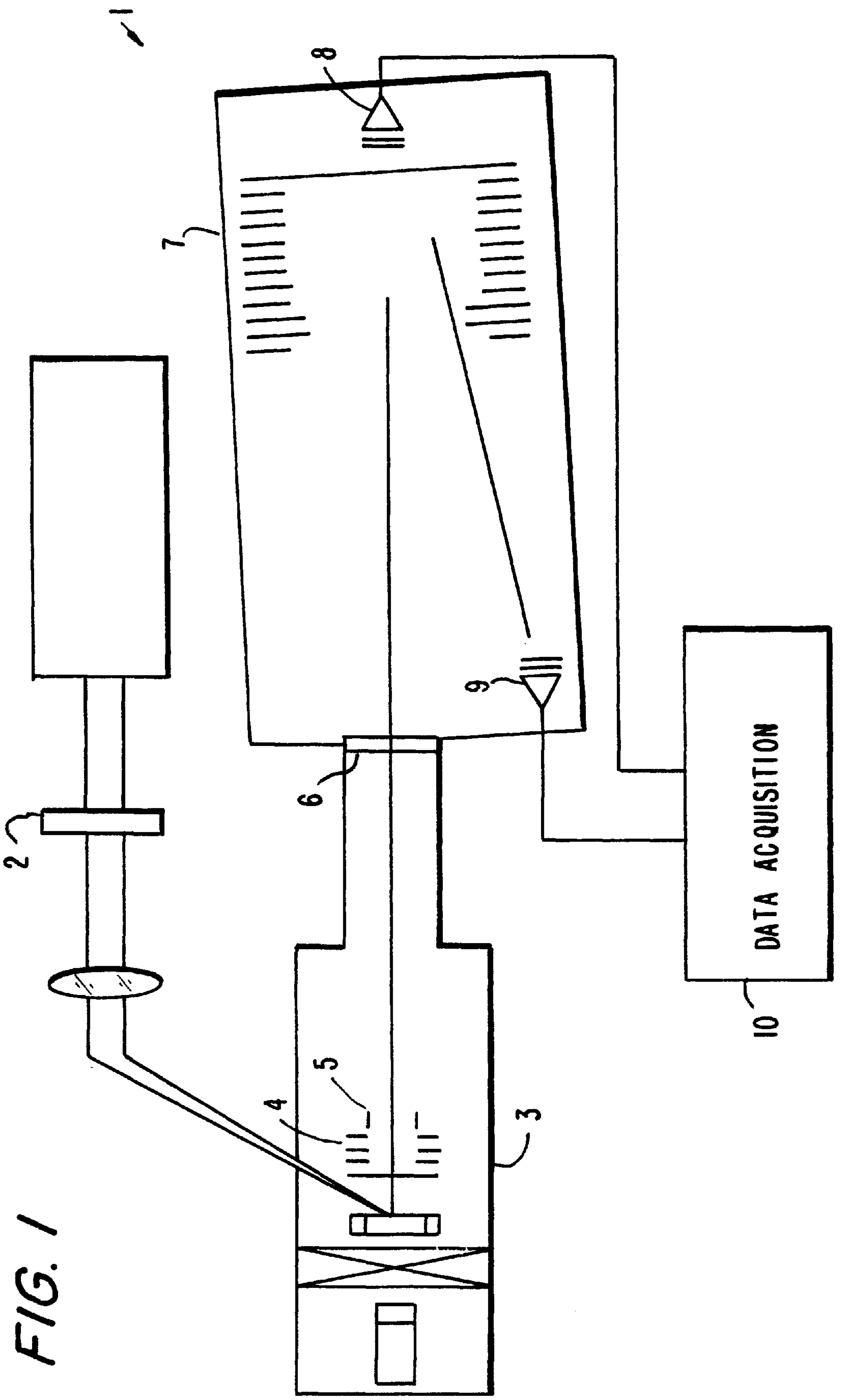
FIG. 1 is a schematic view of prior art commonly referred to as a REFLEX spectrometer.

With respect to FIG. 1, a prior art REFLEX TOFMS 1 is shown, with a laser system 2, ion source 3, Einsel lens 4, deflector 5, ion gate 6, reflectron 7, linear detector 8, reflector detector 9 and a data acquisition unit 10. In FIG. 1, the radiation from laser system 2 generates ions from a solid sample. Ions are accelerated through, and out of, the ion source 3 by an electrostatic field. Lens 4 is used to reduce the divergence of the ion beam exiting source 3. Here, some unwanted ions can be removed from the ion beam using blanking plates 5. The remaining ions may drift through the spectrometer until they arrive at ion gate 6. At ion gate 6, ions of interest are selected for further analysis. Selected ions continue to drift through the spectrometer until arriving at linear detector 8. Alternatively, the reflectron 7 may be used to reflect the ions so that they travel to the reflector detector 9. The mass and abundance of the ions is measured via the data acquisition system 10 as the flight time of the ions from the source 3 to one of the detectors 8 or 9 and the signal intensity at the detectors respectively.

Figure 2:
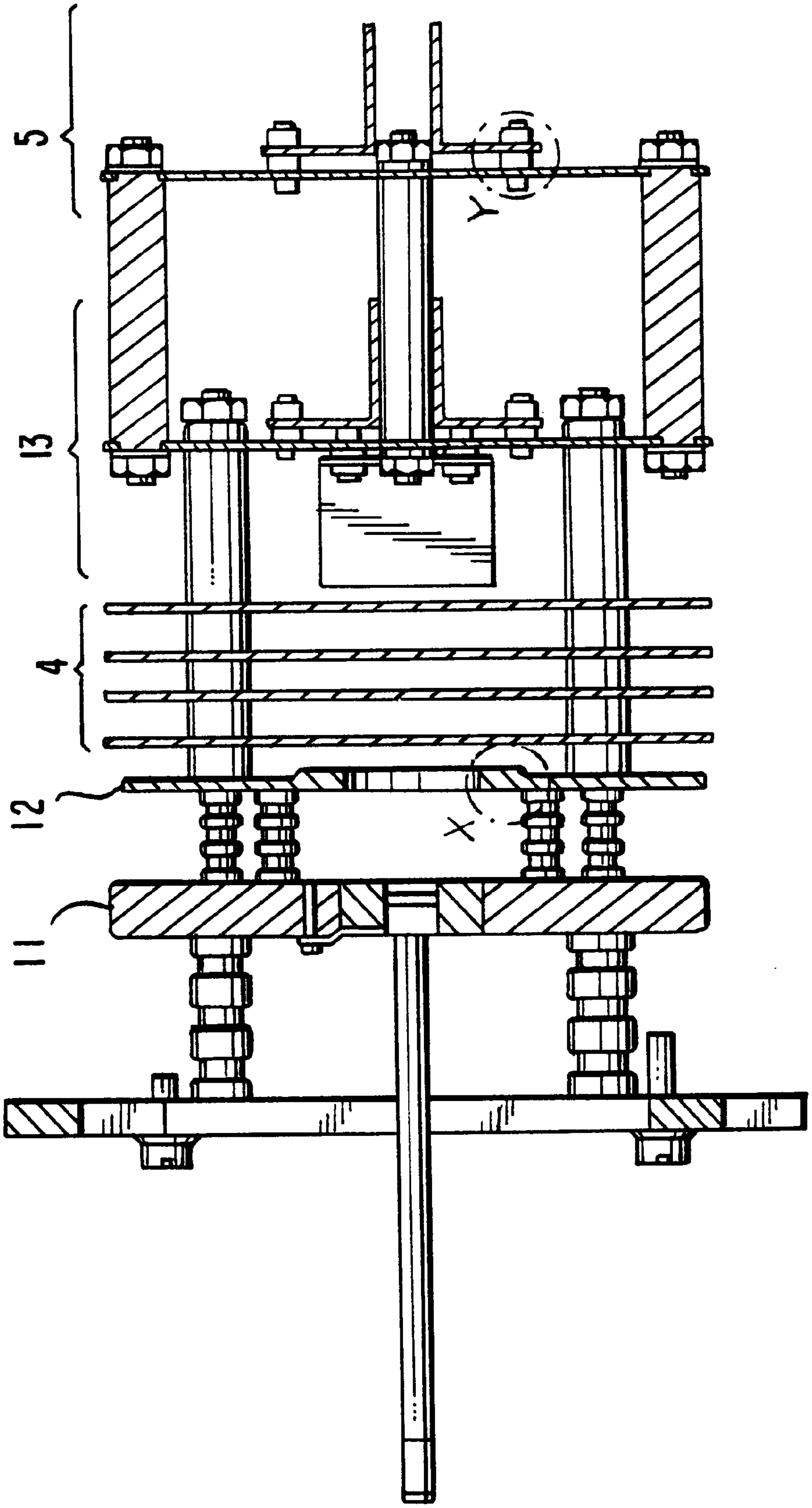
FIG. 2 is a diagram of an ion source as used with the prior art REFLEX spectrometer, including a prior art Einsel lens.

With respect to FIG. 2, a diagram of an ion source 3 as used with the prior art REFLEX TOFMS of FIG. 1 is shown. Ions are generated at the surface of the sample plate 11 which is biased to a high voltage (e.g. 20 kV). Ions are accelerated by an electrostatic field toward the extraction plate 12 which is held at ground potential. Ions are focused by the electrostatic lens system 4, and steered in two dimensions by the deflection plates 13. Finally, some types of unwanted ions are removed from the ion beam by blanking plates 5.

Figure 3:
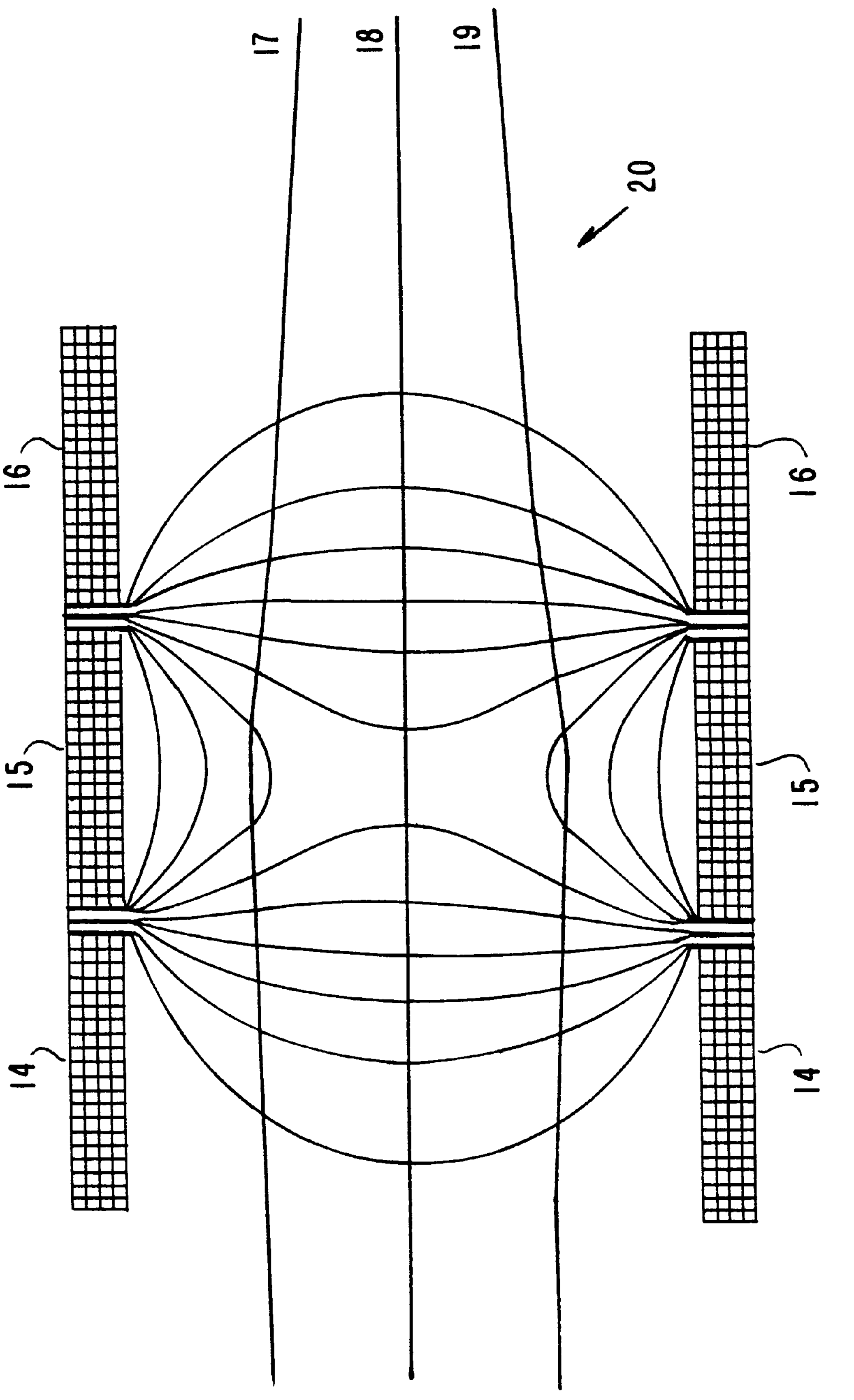
FIG. 3 is a depiction of a conventional Einsel lens including example equipotential lines and ion trajectories.

Prior art electrostatic lens system 4 operates on the same principle as a prior art Einsel lens. As depicted in FIG. 3, a prior art Einsel lens consists of three elements which are used to form an electrostatic field. Each lens element 14, 15, and 16 is composed of conducting material and has an inner surface which is cylindrically symmetric about the primary direction of ion motion. The depiction of FIG. 3 is thus a cross sectional view. The two outer cylinders 14 and 16 are held at a ground potential whereas inner cylinder 15 is energized to a high voltage when the lens is in operation.

Energizing electrode 15 produces an electrostatic field with equipotential lines 20. Equipotential lines 20 were calculated numerically assuming that electrode 15 was energized to a potential of 1000 V. Equipotential lines 20 appear at 100 V intervals between 100 V and 900 V inclusive.

FIG. 3 also shows example ion trajectories 17, 18, and 19 through the energized lens. To calculate these trajectories, 1,500 eV kinetic energy ions were assumed, entering the page from the left and traveling directly toward the right. The direction of the force on the ions at any given point along their path is always towards a lower potential and always perpendicular to the tangent of the equipotential lines. Because path 18 is along the symmetry axis of the lens, the force on an ion on this path will always be on axis. However, on any other path the force on the ion will have some radial component. Thus an ion on path 17 or 19 will experience three regions of force in the radial direction and two regions of force in the axial direction. When an ion is in cylinders 14 or 16 it will experience an outward radial force and a decelerating axial force. The decelerating axial force continues until the ion reaches the midpoint of the lens in electrode 15.

This decelerating axial force tends to increase the flight time of the ion. The outward radial force tends to defocus the ion beam. In electrode 15, the ion experiences an inward radial force. This focuses the ion beam. While in electrode 16, the ion again experiences an outward radial force which defocuses the ion beam. Between the center plane of electrode 15 and the exit of the lens, the ions are accelerated to their original kinetic energy. Even though the net result of the electrostatic field is to focus the ion beam, the defocusing portions of the field cause the operating voltage to be a relatively high 1,500 V. The deceleration of the ions by this high strength field and the resultant increase in ion flight times is correspondingly high compared to that of a shielded lens of the present invention.

Figure 4:
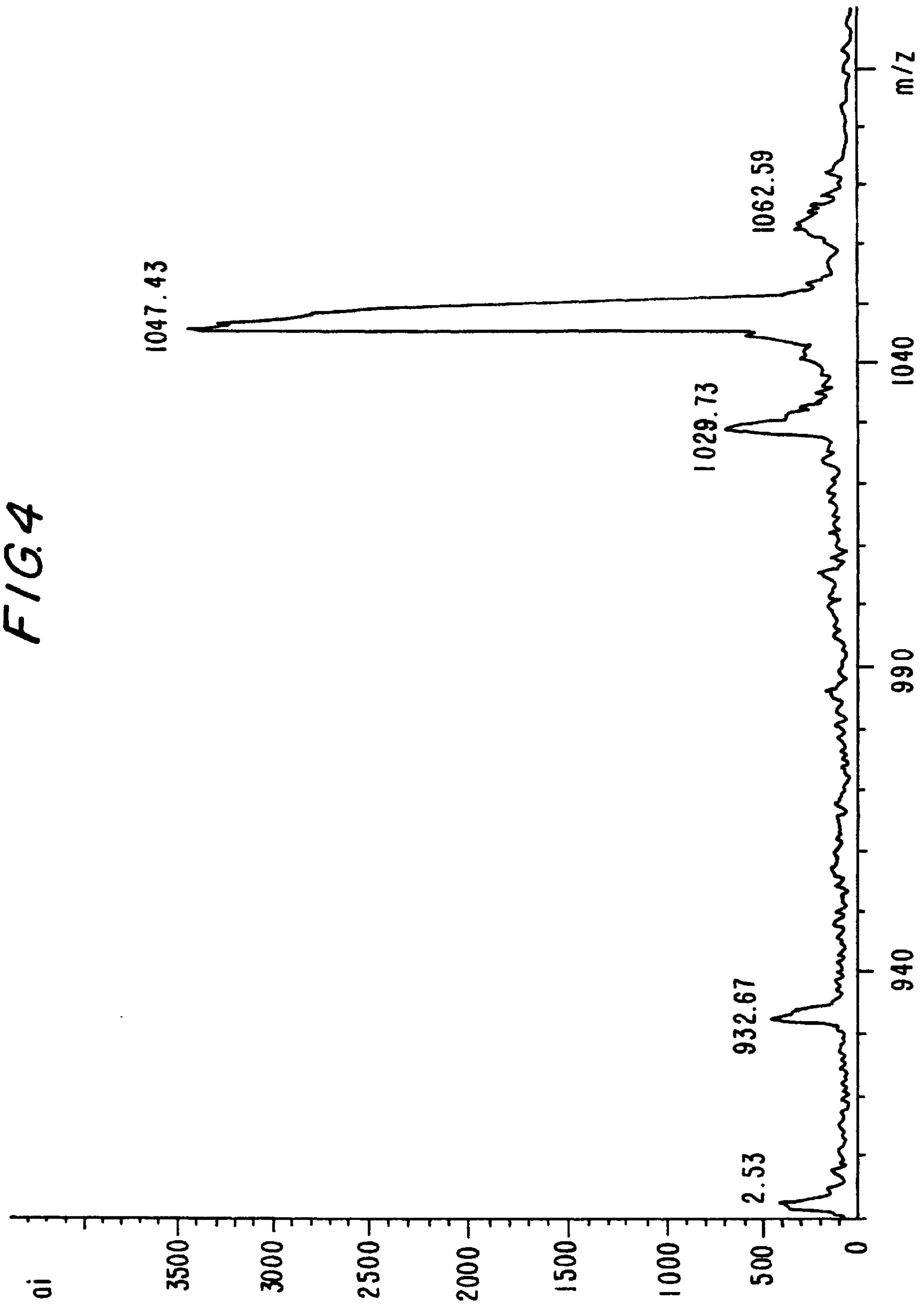
FIG. 4 is a graph of the mass spectrum of angiotensin II showing the molecular ion at mass 1047 amu, using a prior art TOF system.

With respect to FIG. 4, a graph of the mass spectrum of angiotensin II showing the molecular ion at mass 1047 amu, using the prior art REFLEX TOFMS, is shown. This spectrum was recorded using lens 4, reflectron 7, and detector 9. Because reflectron 7 was used, it is possible to observe some ions (at apparent masses 902, 933, and 1030 amu) which are products of the dissociation of the molecular ions.

Figure 5:
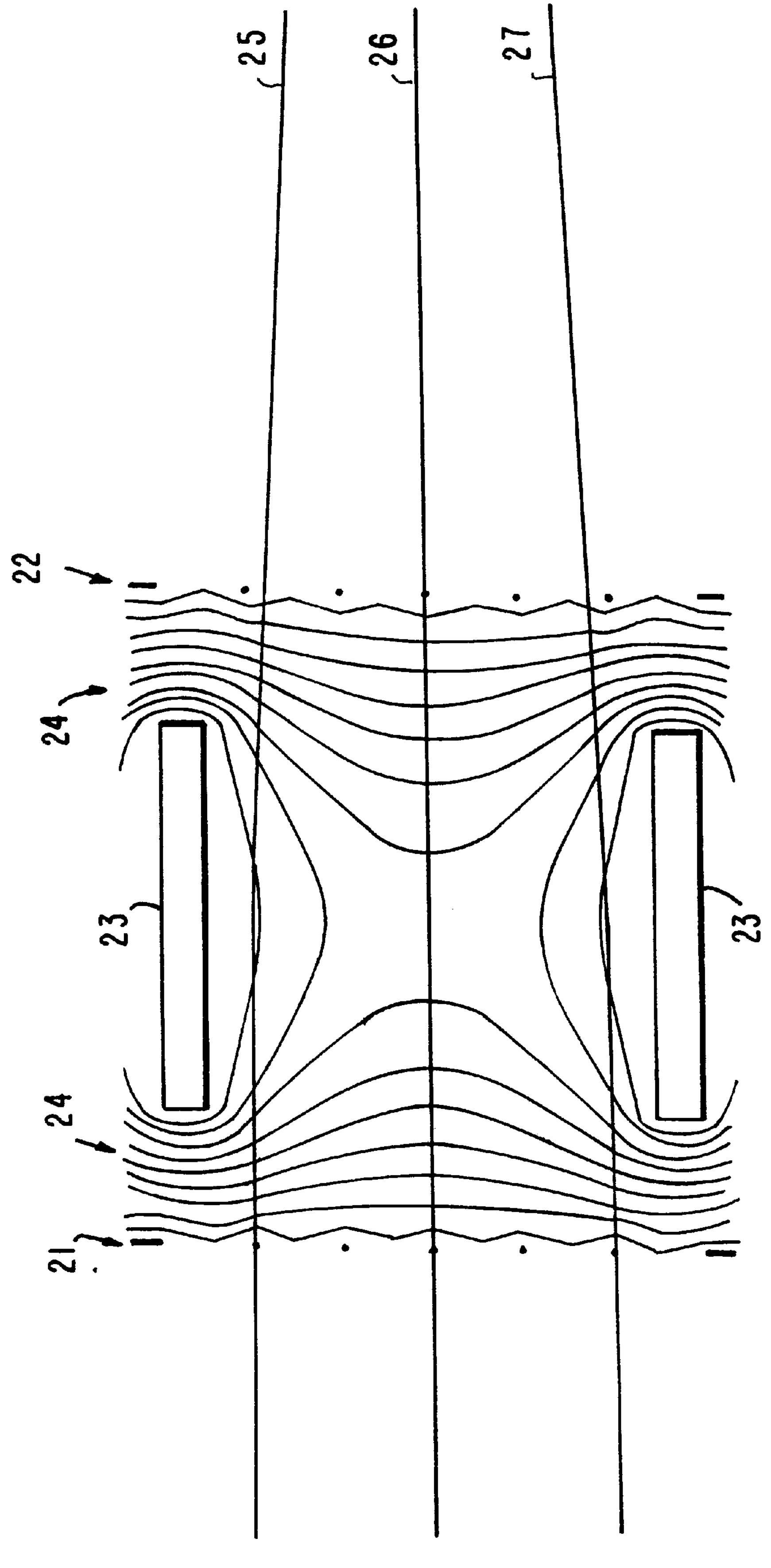
FIG. 5 is a depiction of a shielded lens according to the present invention including example equipotential lines and ion trajectories.

With respect to FIG. 5, a shielded lens according to the present invention is shown. The shielded lens includes two planar grids 21 and 22 and a cylinder 23. Elements 21, 22, and 23 are composed of conducting material. Grids 21 and 22 are fine mesh conducting grid—e.g. 95% transmission, 20 lines per inch, Ni grid. Grids 21 and 22 are held at ground potential during normal operation, while cylinder 23 is energized to some high voltage. For example, to obtain the same focusing as that obtained by the prior art lens of FIG. 3 under the same conditions, cylinder 23 of the shielded lens is biased to 100 V. Energizing cylinder 23 to 100 V produces an electrostatic field with equipotential lines 24. Equipotential lines 24 were calculated numerically and occur at 10 V intervals between 10 and 90 V inclusive.

FIG. 5 also shows example ion trajectories 25, 26, and 27 through the energized lens. To calculate these trajectories, 1,500 eV kinetic energy ions were assumed, entering the page from the left and traveling directly toward the right. The direction of the force on the ions at any given point along their path is always towards a lower potential and always perpendicular to the tangent of the equipotential lines. Because path 26 is along the symmetry axis of the lens, the force on an ion on this path will always be on axis. However, on any other path the force on the ion will have some radial component. Thus an ion on path 25 or 27 will experience forces in the radial and axial directions. Unlike the case of the prior art Einsel lens, the radial force on an ion in a shielded lens of the present invention will always be inward. As a result, the operating voltage of a shielded lens is typically a factor of 10 less than that of a prior art Einsel lens. In the above examples, the prior art Einsel lens required a voltage of 1,000 V whereas under the same conditions the shielded lens of the present invention required only 100 V.

Note that in alternate embodiments, electrode 23 may have some shape other than cylindrical. In fact, to a good approximation, the results of FIG. 5 are valid for a planar symmetric shielded lens. That is if the electrodes represented in FIG. 5 are extended indefinitely into and out of the page, the results in terms of equipotential lines 24 and ion trajectories 25, 26, and 27 would not change much from the cylindrically symmetric device actually simulated. Thus, electrode 23 may be replaced by two planar electrodes of the same (or slightly different) potentials placed on opposite sides of the ion beam.

Figure 6:
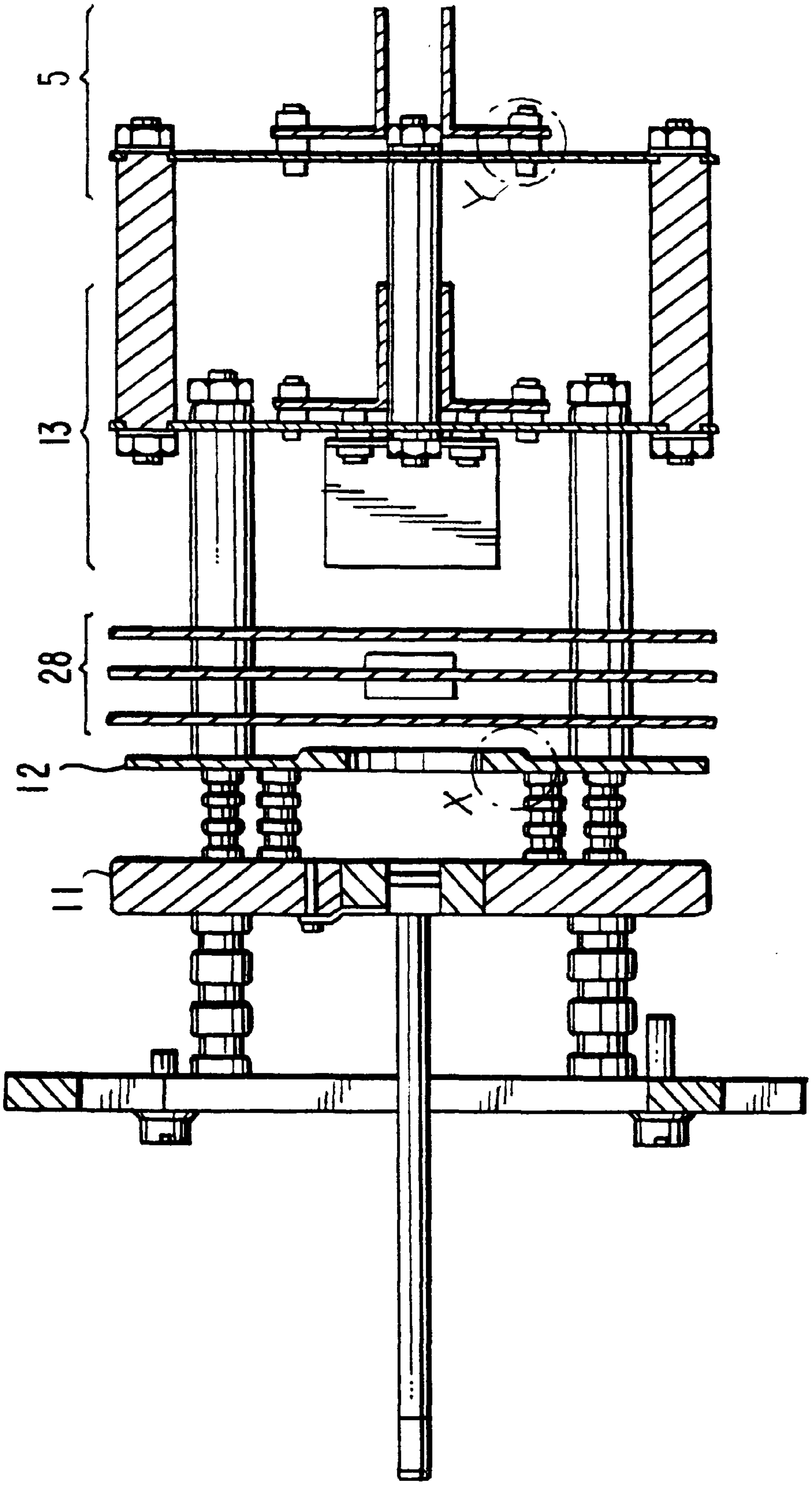
FIG. 6 is a diagram of the ion source of FIG. 2 modified to accept a shielded lens according to the present invention.

With respect to FIG. 6, a diagram of ion source 3 modified to include shielded lens 28 according to the present invention is shown. Ions are generated at the surface of the sample plate 11 which is biased to a high voltage (e.g. 20 kV) . Ions are accelerated by an electrostatic field toward the extraction plate 12 which is held at ground potential. Ions are focused by shielded lens system 28 according to the present invention, and steered in two dimensions by the deflection plates 13. Finally, some types of unwanted ions are removed from the ion beam by blanking plates 5.

As in prior art Einsel lenses, ions in a shielded lens will also experience an acceleration in the axial direction. Ions entering the lens will be decelerated until they are half way through the lens. Then the ions will be accelerated back to their original kinetic energy. As with the Einsel lens this deceleration followed by reacceleration results in a net increase in the total flight time of the ions from sample plate 11 to one of detectors 8 or 9. This effect is more clearly demonstrated in FIG. 7.

Figure 7:
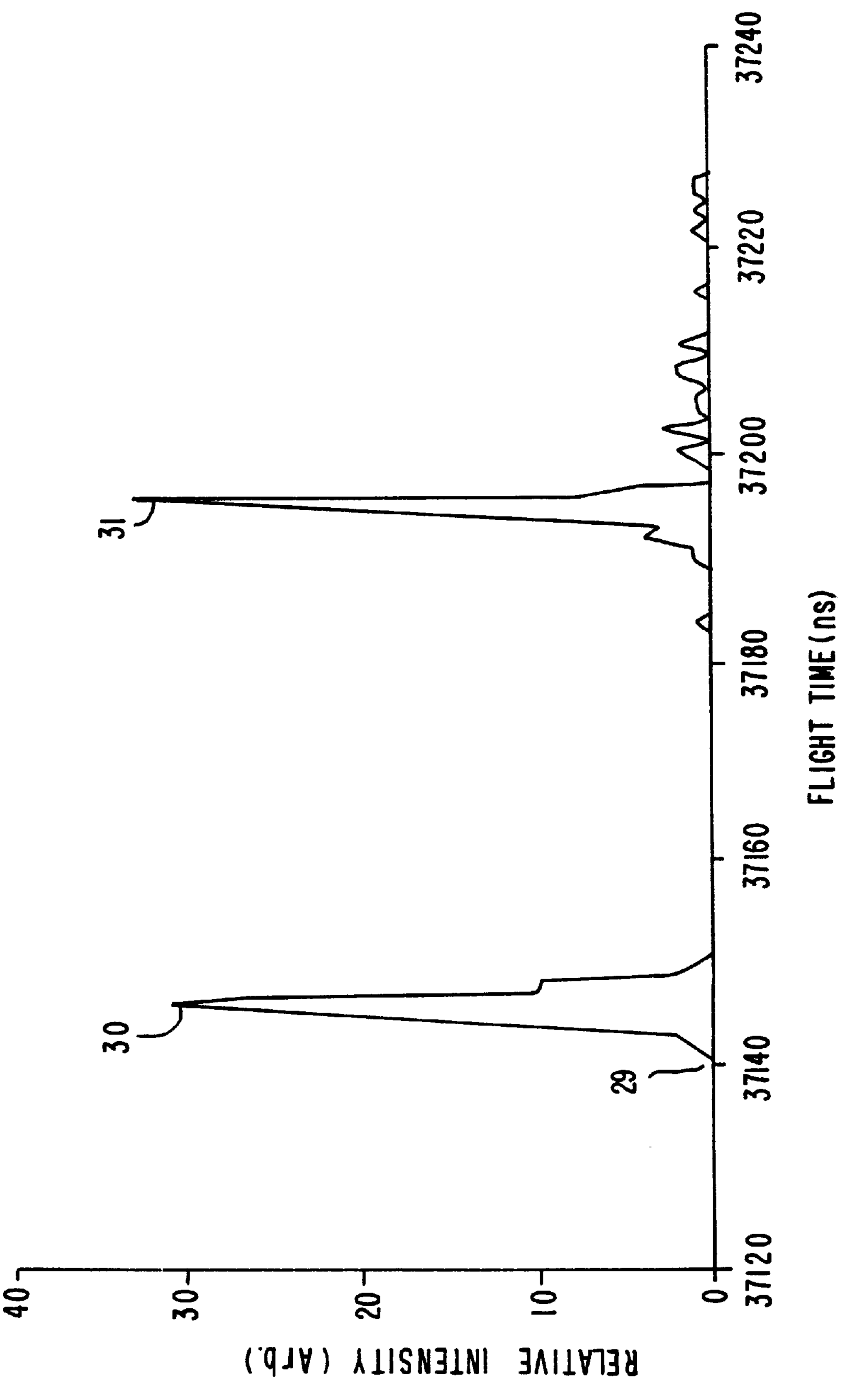
FIG. 7 is a plot of the intensity of an example ion beam as a function of flight time as determined via simulations of a prior art Einsel lens and a shielded lens of the present invention.

FIG. 7 is a plot of ion intensity as a function of ion flight time from sample plate 11 to detector 8 as determined by numerical calculation. The three main features of interest in this plot are 20 flight time 29, flight time distribution 30, and flight time distribution 31. Flight time 29 is the flight time of the ions which would be observed assuming no lens were used. Flight time distribution 30 is that calculated assuming a shielded lens were used. Flight time distribution 31 was calculated assuming a prior art Einsel lens was used.

The shielded lens of the present invention clearly causes less change in the flight time of the ions than the prior art lens. The difference in flight time distribution 30 and original flight time 29 is roughly 5 ns whereas that of flight time distribution 31 and flight time 29 is about 50 ns. The factor of 10 smaller influence on ion flight times by the shielded lens versus the prior art lens is largely the result of the factor of 10 lower operating voltage.

Also, note that the use of the shielded lens of the present invention results in a more Gaussian flight time distribution,

30, than does the use of the prior art lens, 31. Many ions of distribution 31 are lost from the main peak and form a tail at longer flight times. Such a tail does not occur in shielded lens distribution 30.

Finally, taking into account the loss of ions to the tail of distribution 31 and the fact that 10% of the ions would be lost by collision with grids when using a shielded lens, the shielded lens had a transmission efficiency of 85% whereas the prior art Einsel lens had a transmission efficiency of 66%. That is, more ions went undetected when using the prior art lens than when using the shielded lens.

Figure 8:
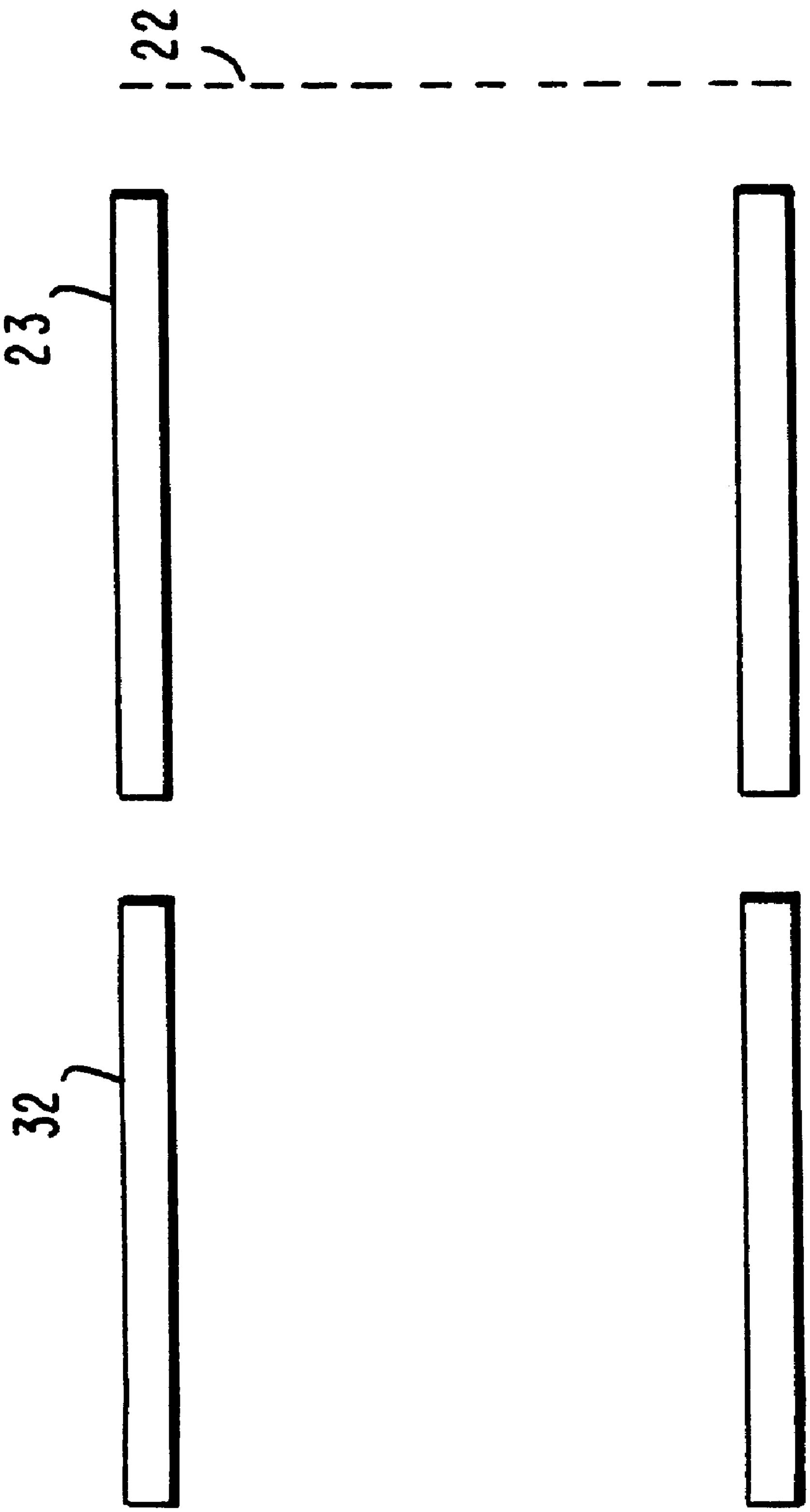
FIG. 8 is a depiction of an alternative embodiment of a shielded lens according to the present invention wherein only one grid electrode is used.

FIG. 8 is a depiction of an alternative embodiment of a shielded lens according to the present invention wherein only one grid electrode is used. As in FIG. 5, the depiction represents a cross section of a cylindrically symmetric device. However, similar results would be obtained from a planar symmetric geometry. As in the preferred embodiment (FIG. 5), the geometry of the alternate embodiment depicted in FIG. 8 consists of conducting cylinder 23, and one of grids 22. However, one of grids 22 has been replaced by cylinder 32 which is virtually identical to cylinder 23.

In this embodiment, cylinder 32 and grid 22 are both held at some first potential (e.g. ground potential) whereas cylinder 23 is held at some second potential (e.g. 100 V). By selecting the correct potentials ions may be focused in a manner similar to that depicted in FIG. 5. Because only one grid is used in this alternate embodiment, the ion transmission efficiency through this device is higher. That is, if the grid material has a 95% transmission efficiency, then passing the ions through two such grids results overall in a transmission efficiency of 90%. Thus, having two grids as in the preferred embodiment results in a lower transmission efficiency device than a device such as the alternate embodiment of FIG. 8 having only one grid.

Even though the device has only one grid, instead of two, the relatively low operating voltage is maintained. The ions will be focused in the region near cylinders 32 and 23 in a manner similar to that described for an Einsel lens (FIG. 3). However, the strongest focusing of the ions occurs in the region near cylinder 23 and grid 22 as described in association with FIG. 5. This embodiment operates at about one fifth of the operating voltage of an Einsel lens of similar geometry.

While the foregoing embodiments of the invention have been set forth in considerable detail for the purposes of making a complete disclosure of the invention, it will be apparent to those of skill in the art that numerous changes may be made in such details without departing from the spirit and the principles of the invention.

What is claimed is:

1. An apparatus for focusing ions in a mass spectrometer, said apparatus comprising:

at least two conducting planar electrodes positioned parallel with each other on opposite sides of said ion beam path, such that the planes occupied by said planar electrodes are parallel to said ion beam path;

at least two planar grid electrodes positioned parallel with each other on either side of said planar electrodes along the axis of said ion beam such that the planes occupied by said grid electrodes are perpendicular to said ion beam path; and means capable of producing an electrical potential difference between said grid electrodes and between said planar electrodes.

2. An apparatus for focusing ions in a mass spectrometer, said apparatus comprising:

at least three electrically conductive electrodes, wherein at least one of said electrodes is a grid formed such that said ions must pass through said grid; and means capable of producing an electrical potential difference between said electrodes;

wherein one of said electrodes is a cylinder aligned coaxially with the path of the ion beam, wherein one planar grid electrode is placed one on each end of said cylinder such that the planes occupied by the grids are perpendicular to the beam path, and wherein each said grid electrode is maintained at a first potential while the cylinder is maintained at a second potential.

3. An apparatus for focusing ions in a mass spectrometer, said apparatus comprising:

at least three electrically conductive electrodes, wherein at least one of said electrodes is a grid formed such that said ions must pass through said grid; and means capable of producing an electrical potential difference between said electrodes;

wherein two of said conducting electrodes are cylinders aligned coaxially with the path of said ion beam and positioned adjacent to one another, wherein a planar grid electrode is positioned on one side of said cylinders along the axis of the ion beam such that the plane occupied by the grid is perpendicular to the beam path, and wherein said grid electrode and one of said cylinders are maintained at a first potential while the second of said cylinders is maintained at a second potential.

4. An apparatus for focusing ions in a mass spectrometer, said apparatus comprising:

at least three electrically conductive electrodes, wherein at least one of said electrodes is a grid formed such that said ions must pass through said grid; and means capable of producing an electrical potential difference between said electrodes;

wherein parallel conducting planar electrodes are placed on opposite sides of said ion beam path such that the planes occupied by said planar electrodes are parallel to said ion beam path, and wherein parallel planar grid electrodes are placed on opposite ends of said planar electrodes along the axis of the ion beam such that the plane occupied by said grid electrodes are perpendicular to the beam path.

* * * * *